(No Model.)
C. G. FRUSHOUR.
AUTOMATIC WATER SERVICE SYSTEM FOR WINDMILLS.
No. 335,807. Patented Feb. 9, 1886.
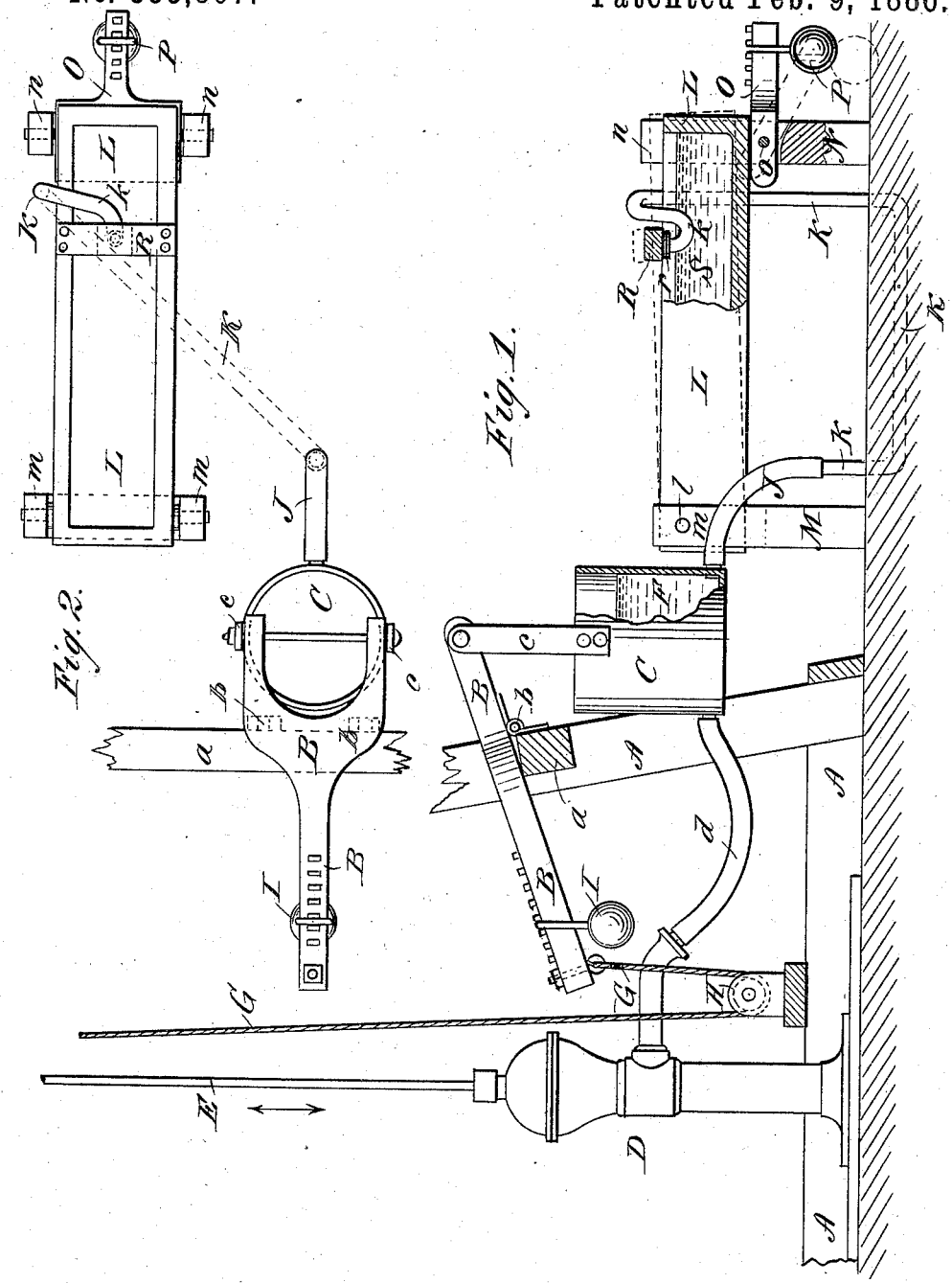
WITNESSES:
Donn Twitchell
C. Sedgwick
INVENTOR:
C. G. Frushour
BY Munn & Co
ATTORNEYS.

UNITED STATES PATENT OFFICE.

CALVIN G. FRUSHOUR, OF LA GRO, INDIANA.

AUTOMATIC WATER-SERVICE SYSTEM FOR WINDMILLS.

SPECIFICATION forming part of Letters Patent No. 335,807, dated February 9, 1886.

Application filed November 27, 1885. Serial No. 184,101. (No model.)

*To all whom it may concern:*

Be it known that I, CALVIN G. FRUSHOUR, of La Gro, in the county of Wabash and State of Indiana, have invented a new and Improved Automatic Water-Service System for Windmills, of which the following is a full, clear, and exact description.

The object of my invention is to provide a simple, inexpensive, and efficient automatic water-service system for windmills, whereby the wind-wheel will be caused to start to operate a pump when the water supplied to a tank by the pump is drawn off for use, and whereby, also, the wind-wheel will be stopped when the tank is refilled, and whereby, also, the water-supply to one or more troughs set at any distance from the wind-wheel and its pump and connected to the main tank may be regulated and maintained as required.

The invention consists in certain novel features of construction and combinations of parts of the water-supply system, all as hereinafter fully set forth.

Reference is to be had to the accompanying drawings, forming part of this specification, in which similar letters of reference indicate corresponding parts in both the figures.

Figure 1 is a vertical partly sectional elevation of my invention; and Fig. 2 is a detail plan view showing the water receiving and supply tanks.

To a cross bar or beam, a, of the frame A of the windmill is pivoted, at b, a lever, B, from the forked outer end of which is suspended by a suitable bail, c, the tank C, with which the pump D is connected by a flexible pipe, d, which is shown opening into the lower part of the tank, but which may be bent upward from the pump, so as to discharge into the top of the tank. The pump D is operated by a rod, E, which is to be connected in any approved way with a crank operated by the wheel of the windmill, (not shown,) and whereby water F will be pumped into the tank C.

To the inner end of the lever B is connected the rope or cord G, which passes beneath a guide-pulley, H, held to the mill-tower frame, and thence upward to the head of the tower, where it will be connected to any approved device or combination of devices, (not shown,) which will operate to throw the wind-wheel out of the wind or stop the wheel when the cord G is pulled downward.

On the lever B is hung a counterbalancing-weight, I, which may be adjusted nearer to or farther from the pivots b of the lever, and whereby the tank C will be allowed to fall and draw on the pull-cord G at any predetermined height or level of the water F in the tank. As shown, the weight is set to allow the tank to fall when the tank is about filled with water from the pump. A flexible pipe, J, opening into the tank C at or near its bottom, connects the tank with a water-supply pipe, K, which may extend any distance from the windmill, and preferably under the ground surface, as shown, to a house, barn, or other structure near or within which is arranged a water-receiving tank or trough, L, from which animals may drink, or from which water may be drawn by any suitable pipe-connections leading to sinks, wash-bowls, and other receptacles about the house. The trough L is pivoted at *l*, near one end, between the opposite side posts, *m m*, of a standard, M, and the other end of the trough rests between the opposite side posts, *n n*, of a standard, N, and on the short arm of a lever, O, which is pivoted at *o* to and between the side posts, *n n*.

On the long arm of the lever O is placed an adjustable counterbalancing-weight, P, which may be set along the lever to cause it to offer more or less resistance to the fall of the adjacent end of the trough. The supply-pipe K rises at the side of the trough L, and is bent over and downward and then upward, as at *k*, and its open upper end stands below a cross bar or piece, R, fixed to or across the top of the trough, said piece R, preferably, having fixed to it a plate, *r*, of rubber or other packing material, adapted to tightly close the open end of the pipe K when the tank L falls.

The operation is as follows: As the water is pumped into the tank C it will flow therefrom through the pipes J K into the trough L, as at S, and when the weight of the trough and the water therein is sufficient to overcome the resistance of the weighted lever O the trough will fall on its pivot *l*, so that its cross-piece R, which acts as a valve, will close the open end of the pipe K and cut off further flow of water therefrom into the trough, and as shown in full lines in Fig. 1. The pump D will continue to work until the water F in the tank C rises to its full height or level, whereupon the weight of the tank will overcome the resistance of the weighted lever B, and the tank will, in falling, pull on the cord G and stop the wind-wheel of the mill, and consequently stop the pump and cut off the flow of water to the tank. Should the water now be used from the trough L, the weighted lever O will fall and raise the adjacent end of the tank and lift the cross-piece R from the end of the pipe K, as in dotted lines in Fig. 1, and allow the water to flow again from the tank F into the trough until the trough again falls to close the pipe K by the cross-piece or valve R. This last outflow of water from the tank will lighten it, so that the weighted end of the lever B will fall, to slacken the rope G and allow the wind-wheel to start again for operating the pump to again supply water to the tank, until it falls, and the lever B again draws on the cord G, to stop the wind-wheel and pump.

There may be as many troughs L connected by suitable pipes, K, with the tank C' as the system of water-service on a farm or in a manufactory or dwelling may require.

Having thus described my invention, what I claim as new, and desire to secure by Letters Patent, is—

1. An automatic water-service system for windmills, comprising a pump adapted to be operated by the wind-wheel, a tank, C, hung to a lever, as at B, and receiving the water from the pump, a cord, as at G, connected to the lever and adapted to stop the wind-wheel when the tank falls, a pivoted trough, L, a lever, as at O, supporting the free end of said trough, a cross-piece or valve, as at R, on the trough, and a pipe, K, connecting the tank C and trough L, and adapted to be closed by the valve R as the trough falls, substantially as herein set forth.

2. In an automatic water-service system for windmills, the combination, with a water-supply tank, of a trough, as at L, pivoted at one end, a lever, as at O, supporting the other end of the trough, a pipe, as at K, connecting said trough with the supply-tank, and a cross-piece or valve, R, fixed to the trough and adapted to close the end of the pipe to cut off the water-supply to the trough when the trough falls by the weight of water filled into it, substantially as herein set forth.

CALVIN G. FRUSHOUR.

Witnesses:
ANDREW EGNEW,
CON RAGAM.